(12) United States Patent
Sonnier et al.

(10) Patent No.: US 11,629,787 B1
(45) Date of Patent: Apr. 18, 2023

(54) FLUID VALVE

(71) Applicant: AGI INDUSTRIES, INC., Lafayette, LA (US)

(72) Inventors: Bryan T. Sonnier, Lafayette, LA (US); Christopher F. Rooney, Gordonville, TX (US)

(73) Assignee: AGI INDUSTRIES, INC., Lafayette, LA (US)

( * ) Notice: Subject to any disclaimer, the term of this patent is extended or adjusted under 35 U.S.C. 154(b) by 0 days.

(21) Appl. No.: 17/508,530

(22) Filed: Oct. 22, 2021

(51) Int. Cl.
| | |
|---|---|
| *F16K 37/00* | (2006.01) |
| *F16K 3/08* | (2006.01) |
| *F16K 3/314* | (2006.01) |
| *F16K 27/04* | (2006.01) |
| *F16K 3/02* | (2006.01) |
| *F16K 31/53* | (2006.01) |

(52) U.S. Cl.
CPC ............ *F16K 3/085* (2013.01); *F16K 3/0254* (2013.01); *F16K 3/314* (2013.01); *F16K 27/045* (2013.01); *F16K 31/535* (2013.01); *F16K 37/0058* (2013.01)

(58) Field of Classification Search
CPC .. F16K 31/085; F16K 31/0254; F16K 31/314; F16K 27/045; F16K 31/535; F16K 37/0058
See application file for complete search history.

(56) References Cited

U.S. PATENT DOCUMENTS

| | | | |
|---|---|---|---|
| 10,941,870 B1* | 3/2021 | Sonnier | F16K 35/00 |
| 2021/0301944 A1* | 9/2021 | Haro-Valdez | F16K 3/085 |
| 2022/0146006 A1* | 5/2022 | Molina | F16K 3/32 |

FOREIGN PATENT DOCUMENTS

| | | | | |
|---|---|---|---|---|
| WO | WO-2020170193 A1 * | 8/2020 | | F16K 15/028 |

* cited by examiner

*Primary Examiner* — Kevin R Barss
(74) *Attorney, Agent, or Firm* — Ted M. Anthony

(57) ABSTRACT

A valve has flow trim assembly that can be quickly and efficiently removed and repaired or replaced. A body section having a central through bore defines an inlet, an outlet and inner chamber or space. An upstream cap and inlet hub are disposed at the inlet of the body member, while a downstream cap and outlet hub are disposed at the outlet of the body member. An actuator stem extends into the inner chamber, while a gear train can transfer torque force applied to the actuator stem to a rotator. A first (movable) trim member is attached to the rotator and can be selectively rotated relative to a second (fixed) trim member. The first and second trim members cooperate to adjust flow opening through the valve.

16 Claims, 24 Drawing Sheets

FLUID VALVE

CROSS REFERENCES TO RELATED APPLICATIONS

NONE

STATEMENTS AS TO THE RIGHTS TO THE INVENTION MADE UNDER FEDERALLY SPONSORED RESEARCH AND DEVELOPMENT

NONE

BACKGROUND OF THE PRESENT INVENTION

1. Field of the Invention

The present invention pertains to a valve used to control and/or interrupt the flowing pressure and flow rate of a fluid flowing through a pipeline, flow line or other fluid conduit. More particularly, the present invention pertains to a modular valve that is robust, durable and efficient.

2. Description of Related Art

Valves of different types are configurations that are used to control and/or interrupt the flow of fluids are well known in the art. Ideally, valves should be effective, have long life spans and should be easy to operate and maintain. Valve failures can be dangerous, environmentally undesirable, and costly; as a result, valves should be durable and should be able to withstand environmental and operational conditions, which can frequently be severe.

For example, valves can often be exposed to very severe conditions, particularly during use in the oil and gas industry and related applications. Well production fluids frequently contain solids (such as sand-like mineral particles or other debris), brine, and acids. The erosive and corrosive characteristics of such produced well fluids in valves can be aggravated by the effects of increased fluid turbulence, impingement on metal surfaces, and a phenomenon known as fluid cavitation.

Conventional means to address or overcome such challenges have not been completely successful. Despite preventive measures, conventional valves continue to suffer from erosion, corrosion and other harmful effects, which can often degrade operational capabilities of such valves; this can often make said valves dangerous, unsafe and/or unusable.

Thus, there is a need for an improved valve that can overcome many of the limitations of conventional valves. Said improved valve should be robust, durable and effective. Further, said improved valve should permit actuation through use of either manual handles or automatic actuators, while also providing reliable visual indication of valve actuation and/or position.

SUMMARY OF THE INVENTION

The present invention comprises a valve that addresses the erosion, corrosion, and other operational problems commonly encountered with conventional valves. In a preferred embodiment, the valve assembly of the present invention generally comprises a valve body member having a bore extending through said body member from an inlet to an outlet and defining an inner flow trim chamber. An inlet hub is operationally attached at said inlet and an outlet hub is operationally attached at said outlet.

Gears are utilized to achieve a reduced operating (opening and closing) torque and change direction of actuation (typically 90 degrees). Said gears are beneficially positioned out of a wetted environment, making said gears and related mechanism easier to maintain and significantly less likely to get clogged or fouled, particularly if sand or other solid materials are present in the fluid stream. Further, an entire actuation stem assembly and attached pinion gear can be removed and repaired/replaced without depressurizing the entire valve apparatus.

Once properly assembled, a valve stem is marked to display trim position without the need for secondary devices, while the stem housing cannot be inadvertently pressurized with process fluid. Said stem housing further comprises at least one internal seal designed to release pressure should an internal cavity between the valve housing/body and wetted components become pressurized. The upper surface of said stem housing comprises an actuator pad that permits direct mount of an actuator to the valve drive stem. Further, the stem design allows quick and efficient transition between automated and manual actuation systems.

The valve of the present invention further comprises a housing or body having a lower drain to indicate the presence of internal leakage. Said drain can be beneficially fitted with a filtered plug to prevent dust or other external contaminant(s) from accessing interior portions of said valve.

Components of the valve of the present invention can be beneficially marked via engraving or laser etching for alignment to ensure and confirm proper assembly including, without limitation, "zero" position which allows for quick and easy actuator to valve calibration. Internal components having a "close fit" include pry notches to allow easy disassembly, while main internal seals have secondary backup seals should the primary seals fail. Further, internal valve components can be quickly and efficiently removed and replaced.

Hubs of the valve of the present invention can be modular and replaceable, which allows for a low-cost repair should they become damaged. Inlet and outlet hubs are outfitted with injection/monitor ports, allowing for direct injection of remediation chemicals or direct sensing of internal fluid pressure. For the outlet hub, use of pressure sensing port, in combination with a sealed wear sleeve, allows said port to act as a wear sleeve damage indicator.

Both upstream and downstream hubs or end caps of the valve of the present invention can also be outfitted with a fixed orifice bean to permit staging of multiple pressure drops across the valve. A special hub allows a plurality of pressure drops either upstream or downstream, while pressure containing bolts have an air gap to prevent corrosive gas from saturating said bolts.

BRIEF DESCRIPTION OF THE DRAWINGS

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

FIG. 22A depicts a bottom perspective view of a stem housing of the valve assembly of the present invention depicted in FIG. 22.

DETAILED DESCRIPTION OF A PREFERRED EMBODIMENT

While the present invention will be described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present invention not be limited to the particular embodiments disclosed as the best mode contemplated for carrying out this invention, but that the invention will include all embodiments (and legal equivalents thereof).

Figure 1:
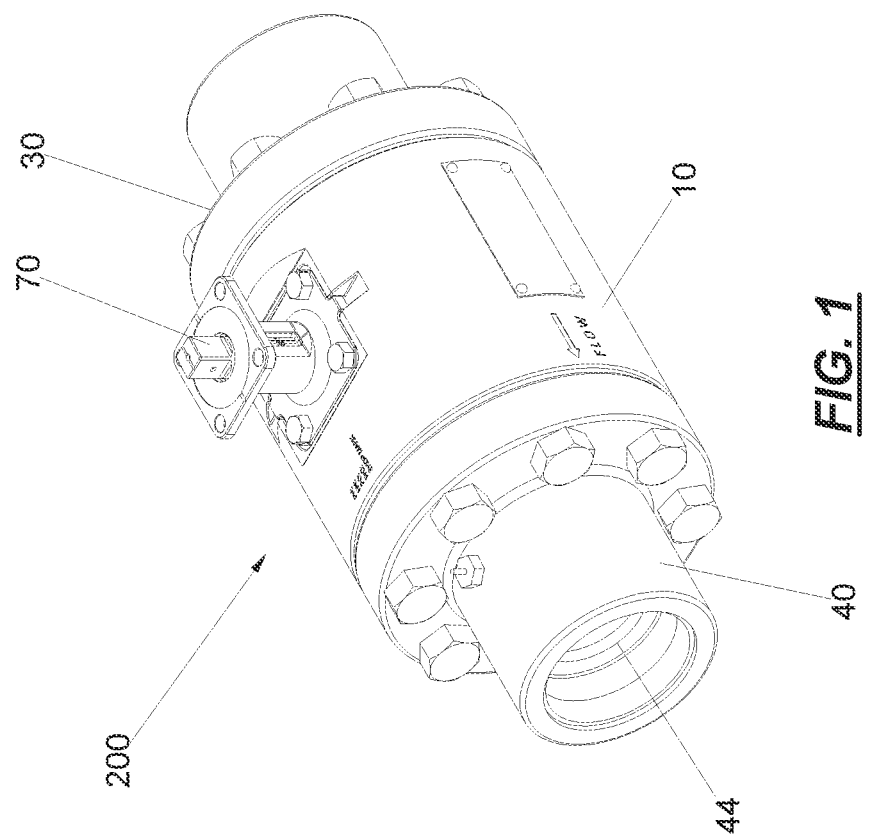
FIG. 1 depicts a first side perspective view of the valve assembly of the present invention.
Figure 2:
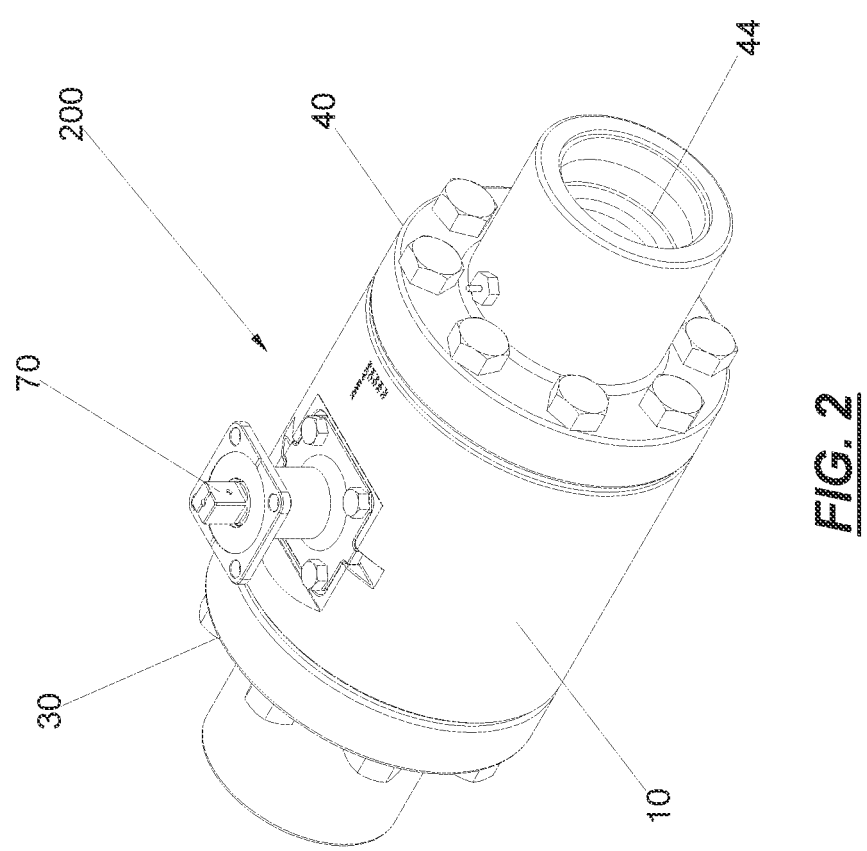
FIG. 2 depicts a second side perspective view of the valve assembly of the present invention.

In a preferred embodiment, valve assembly 200 is used to control and/or interrupt the flowing pressure and flow rate of a fluid flowing through a pipeline, flow line or other fluid conduit. Referring to the drawings, FIG. 1 depicts a first side perspective view of valve assembly 200 of the present invention, while FIG. 2 depicts a second side perspective view of said valve assembly 200. Referring to FIGS. 1 and 2, valve assembly 200 generally comprises valve body or housing 10, as well as operationally attached inlet hub 30, outlet hub 40 and rotatable actuation stem 70. It is to be observed that valve assembly 200 defines an internal flow path (more fully described herein) that, when unobstructed, permits fluid flow through said valve assembly 200 and out central through bore 44 of outlet hub 40.

Figure 3:
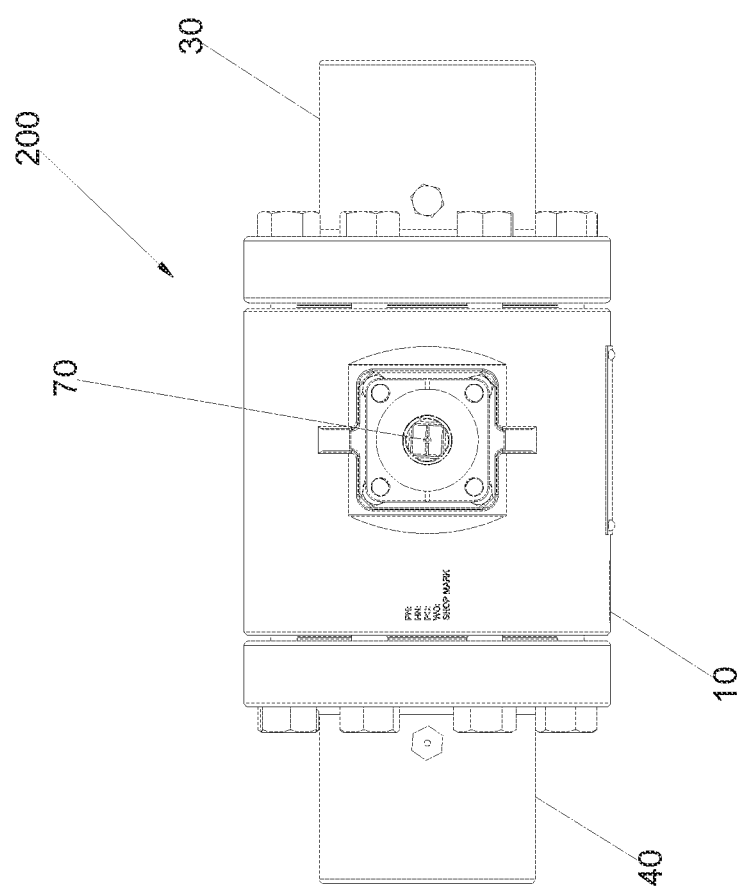
FIG. 3 depicts a top view of the valve assembly of the present invention.
Figure 4:
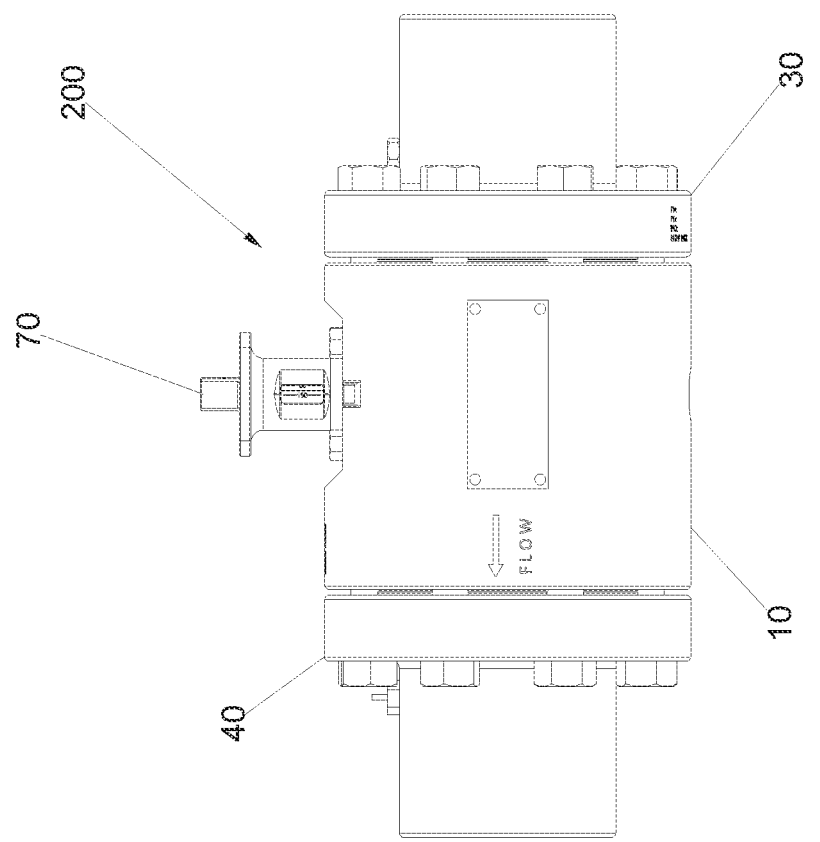
FIG. 4 depicts a side view of the valve assembly of the present invention.
Figure 5:
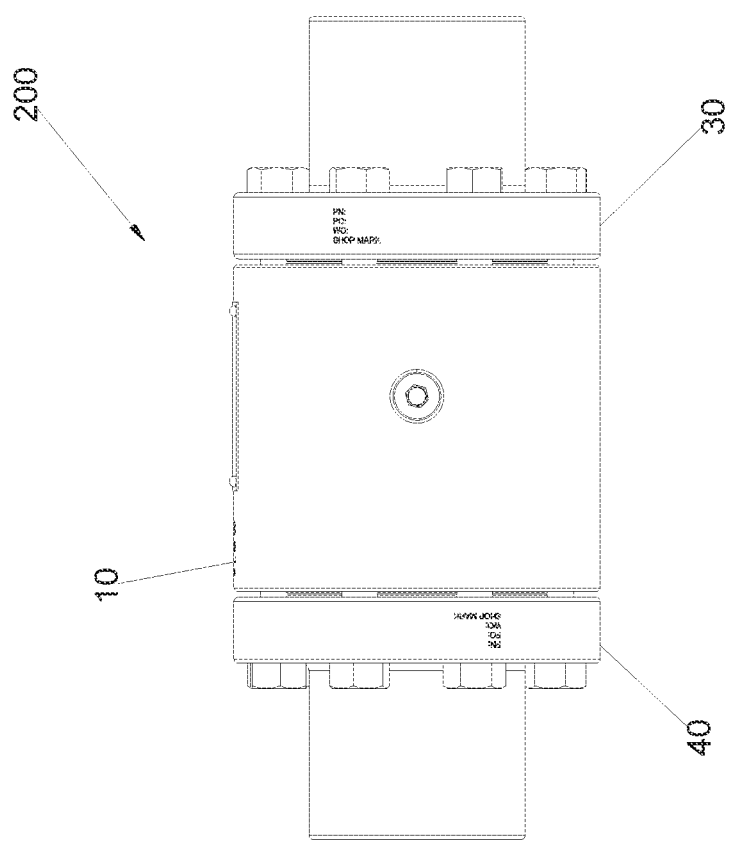
FIG. 5 depicts a bottom view of the valve assembly of the present invention.

FIG. 3 depicts a top view of the valve assembly 200 of the present invention. FIG. 4 depicts a side view of said valve assembly 200, while FIG. 5 depicts a bottom view of said valve assembly 200. Referring to FIGS. 3 through 5, valve assembly 200 generally comprises valve body or housing 10, as well as operationally attached inlet hub 30, outlet hub 40 and actuation stem 70. It is to be observed that valve assembly 200 defines an internal flow path that, when unobstructed, permits fluid flow through said valve assembly 200 and out central through bore 44 of outlet hub 40.

As with conventional valves, a valve assembly 200 of the present invention can be installed at one or more desired locations along the length of a pipeline, flow line or other conduit containing gas, liquid and/or other fluid. Valve assembly 200 can selectively control and/or interrupt the flowing pressure and flow rate of such gas, liquid and/or other fluid.

Figure 6:
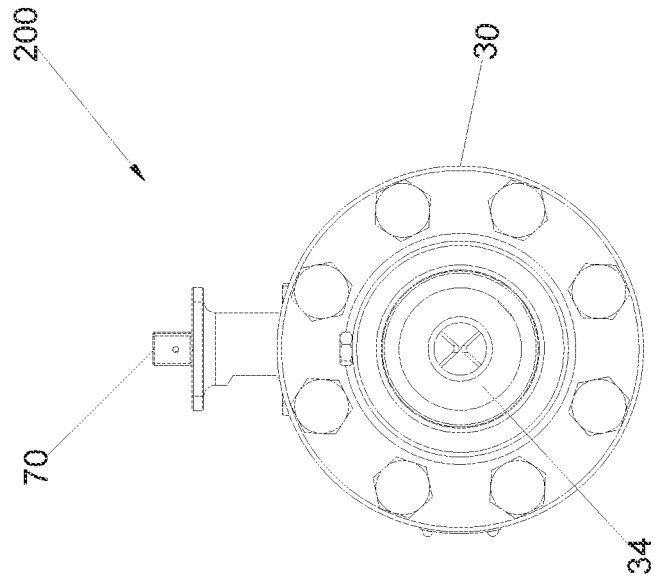
FIG. 6 depicts a first end view of the valve assembly of the present invention.
Figure 7:
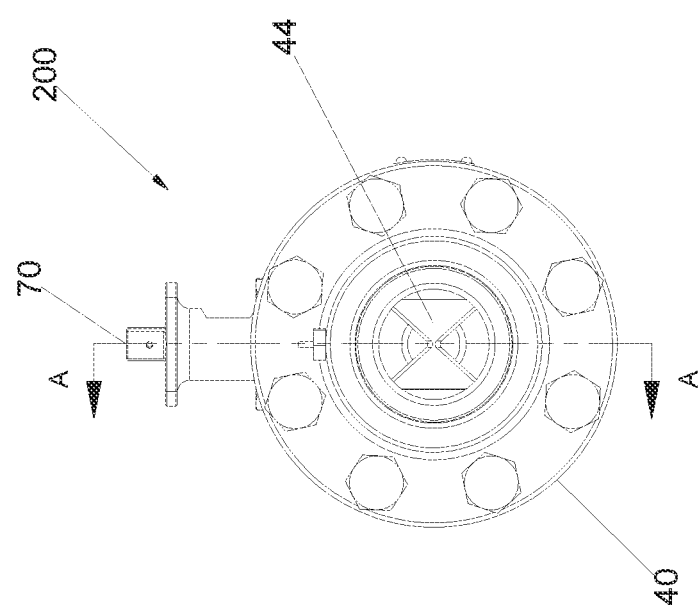
FIG. 7 depicts a second end view of the valve assembly of the present invention.

FIG. 6 depicts a first end view of valve assembly 200. As depicted in FIG. 6, inlet hub 30 has central through bore 34. It is to be observed that central through bore 34 generally defines a fluid inlet that is in fluid communication with the internal flow path of valve assembly 200. FIG. 7 depicts a second end view of the valve assembly of the present invention. As depicted in FIG. 7, outlet hub 40 has central through bore 44. It is to be observed that central through bore 44 generally defines a fluid out let that is in fluid communication with the internal flow path of valve assembly 200.

Figure 8:
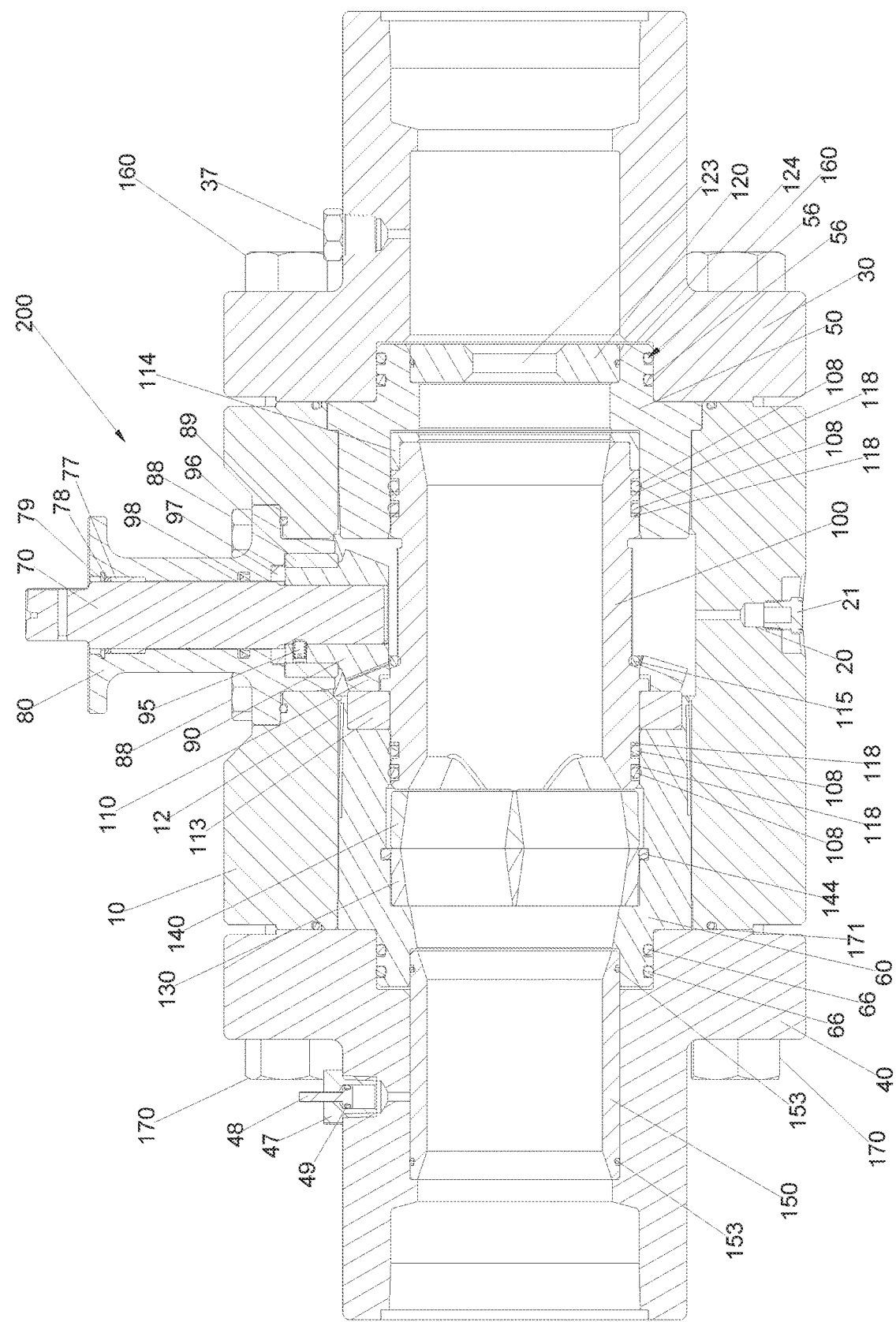
FIG. 8 depicts a side sectional view of the valve assembly of the present invention along line A-A of FIG. 7.

FIG. 8 depicts a side sectional view of the valve assembly 200 of the present invention along line A-A of FIG. 7. Generally, valve assembly 200 comprises body section 10 having a central through bore 11 and defining an inner chamber or space 12. Upstream cap 50 and inlet hub 30 are disposed at the upstream end of said body member 10. Downstream cap 60 and outlet hub 40 are disposed at the downstream end of said body member 10. Rotator 100 is rotatably disposed within inner space or chamber 12 of body 10. FIG. 8 is also discussed in more detail below.

Figure 9:
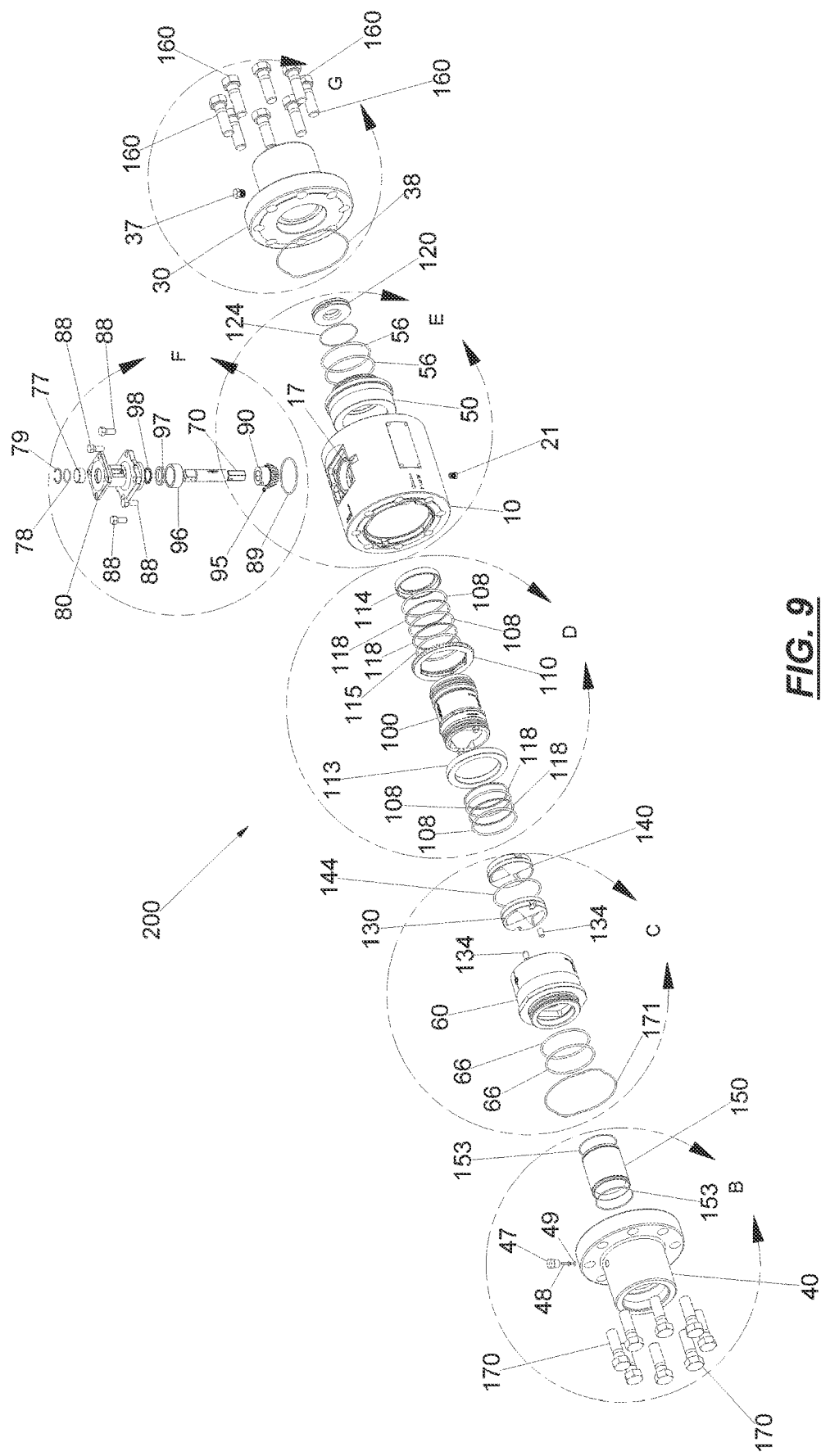
FIG. 9 depicts an exploded perspective view of the valve assembly of the present invention.

FIG. 9 depicts an exploded perspective view of valve assembly 200 of the present invention. Referring to FIG. 9, valve assembly 200 generally comprises valve housing member or body 10. Inlet hub 30 is operationally attached to one end of said valve body 10 using inlet hub bolts 160. Similarly, outlet hub 40 is attached to the opposite end of valve body 10 using outlet hub bolts 170. Wear sleeve 150 is received within outlet hub 40. Upstream cap 50 is partially received within body 10 and secured in place by inlet hub 30. Downstream cap 60 is also partially received within body 10 and secured in place by outlet hub 40.

Still referring to FIG. 9, valve assembly 200 further comprises first (stationary) valve trim 130 and second (movable) valve trim 140 disposed within downstream cap 60. Second valve trim 140 is operationally attached to rotator 100 which, in turn, is operationally attached to bevel gear 110. Stem housing 80 is attached to valve body 10. Stem 70 is rotatably received within stem housing 80 and extends through stem assembly aperture 17. Said stem is also operationally attached to pinion gear 90 which is disposed within body 10 Pinion gear 90 is operationally engaged against bevel gear 110. Additional reference numbers depicted on FIG. 9 correspond to those depicted in subsequent figures including, without limitation, detailed views depicted in FIGS. 10 through 15.

Figure 10:
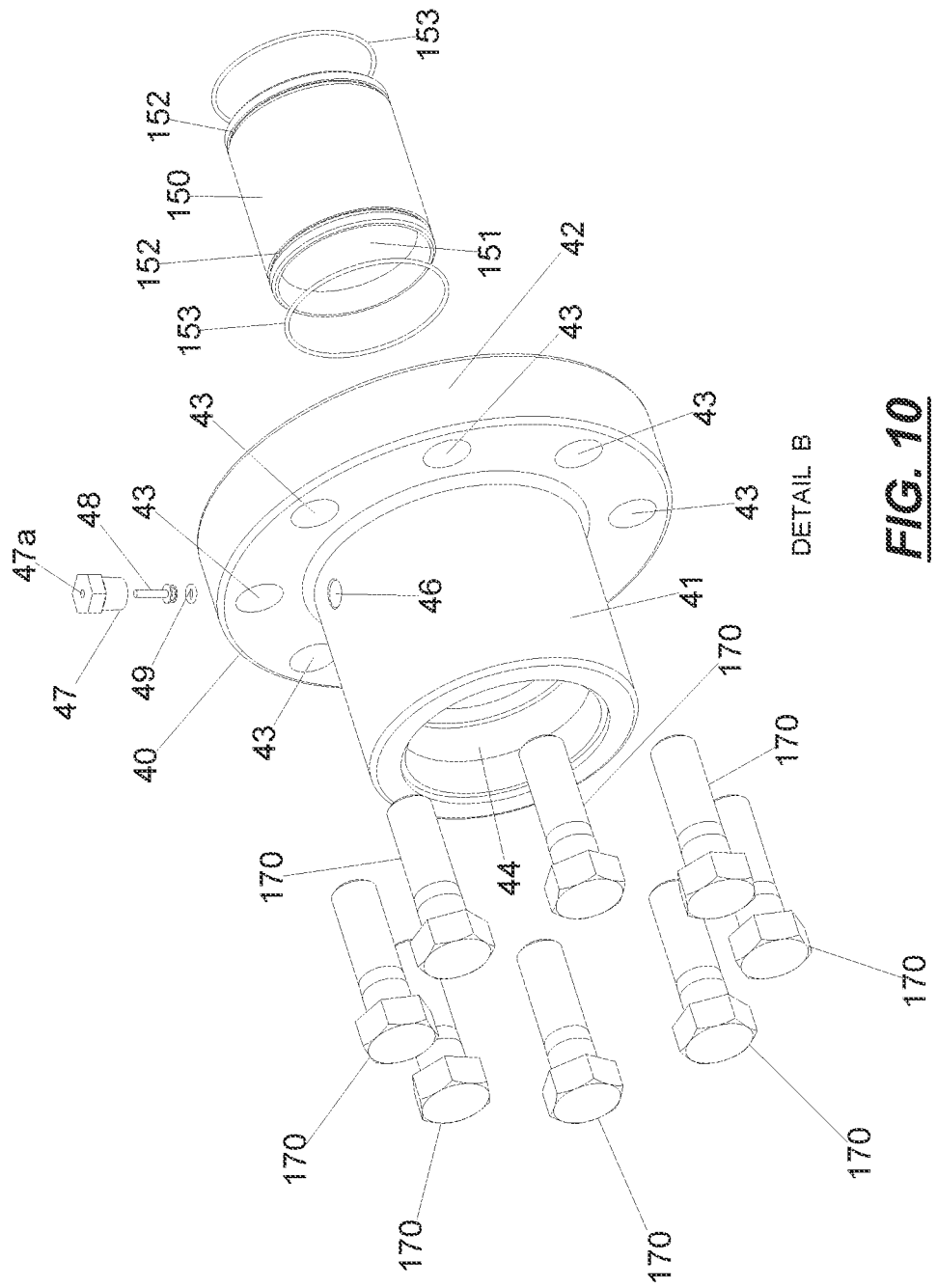
FIG. 10 depicts a perspective view of detail area "B" depicted in FIG. 9.

FIG. 10 depicts a perspective view of detail area "B" depicted in FIG. 9. Outlet hub 40 generally comprises connection extension 41 and flange member 42. A plurality of bores 43 are disposed around flange member 42 in spaced relationship. Central through bore 44 extends through outlet hub 40. A plurality of outlet hub bolts 170 can be received within flange bores 43. In a preferred embodiment, said outlet hub bolts 170 comprise conventional threaded bolts; however, it is to observed that other mechanical fasteners can be used without departing from the scope of the present invention.

Still referring to FIG. 10, in a preferred embodiment port 46 extends through connection extension 41 and into central through bore 44. Poppet 48, having poppet seal 49, is movable disposed within central bore 47a of plug 47. Said plug 47 is, in turn, received within port 46 of outlet hub 40. Substantially tubular wear sleeve 150 has central through bore 151, as well as circumferential grooves 152 that extend around said wear sleeve 150. O-rings 152, which can be constructed of rubber or other elastomeric material having desired sealing properties, are received with said circumferential grooves 152. Wear sleeve 150 and attached O-rings 153 are received within central through bore 44 of outlet hub 40.

Figure 11:
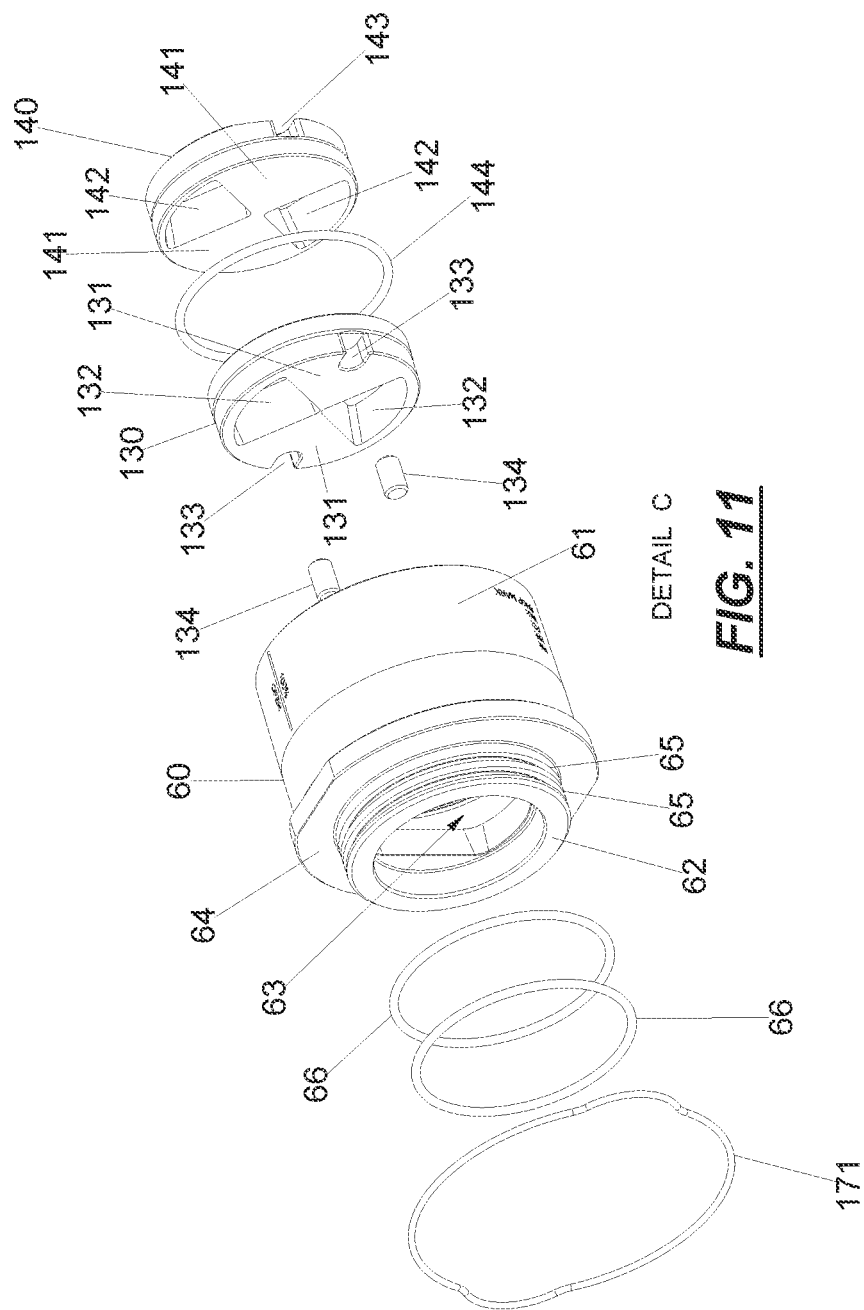
FIG. 11 depicts a perspective view of detail area "C" depicted in FIG. 9.

As depicted in FIG. 11, downstream cap 60 generally comprises body section 61, seal extension 62 and flange shoulder member 64. A plurality of circumferential grooves 65 extend around seal extension 62. Central through bore 63 extends through said downstream cap 60. O rings 66, which are constructed of rubber or other elastomeric sealing material, are disposed within circumferential grooves 65. Outlet seal 171 is disposed between body section 10 and flange 42 of outlet hub 40 (not shown in FIG. 11).

First valve trim 130 generally comprises body section 131 and sized apertures 132 extending through said body section 131. Although said sized apertures 132 are depicted as being substantially wedge-shaped, it is to be understood that said sized apertures 132 can have different dimensions and/or geometries depending upon anticipated fluid flow conditions. By way of example, but not limitation, said sized apertures 132 can be rounded, or can be larger or smaller than the embodiment depicted in FIG. 11. A plurality of notches or recesses 133 are disposed along the outer perimeter of said first valve trim 130. Dowels 134 can be received in said notches 133 and secured against movement by said downstream cap 60; said dowels 134 anchor said valve trim 130 against rotational movement.

Second valve trim 140 generally comprises body section 141 and sized apertures 142 extending through said body section 141. Although said sized apertures 142 are depicted as being substantially wedge-shaped, it is to be understood that said sized apertures 142 can have different dimensions and/or geometries depending upon anticipated fluid flow conditions. By way of example, but not limitation, said sized apertures 142 can be rounded, or can be larger or smaller than the embodiment depicted in FIG. 11. At least one notch or recess 143 is disposed along the outer perimeter of said second valve trim 140. Trim seal member 144, which can be constructed of rubber or other elastomeric sealing material, is disposed between first valve trim 130 and downstream cap 60.

Figure 12:
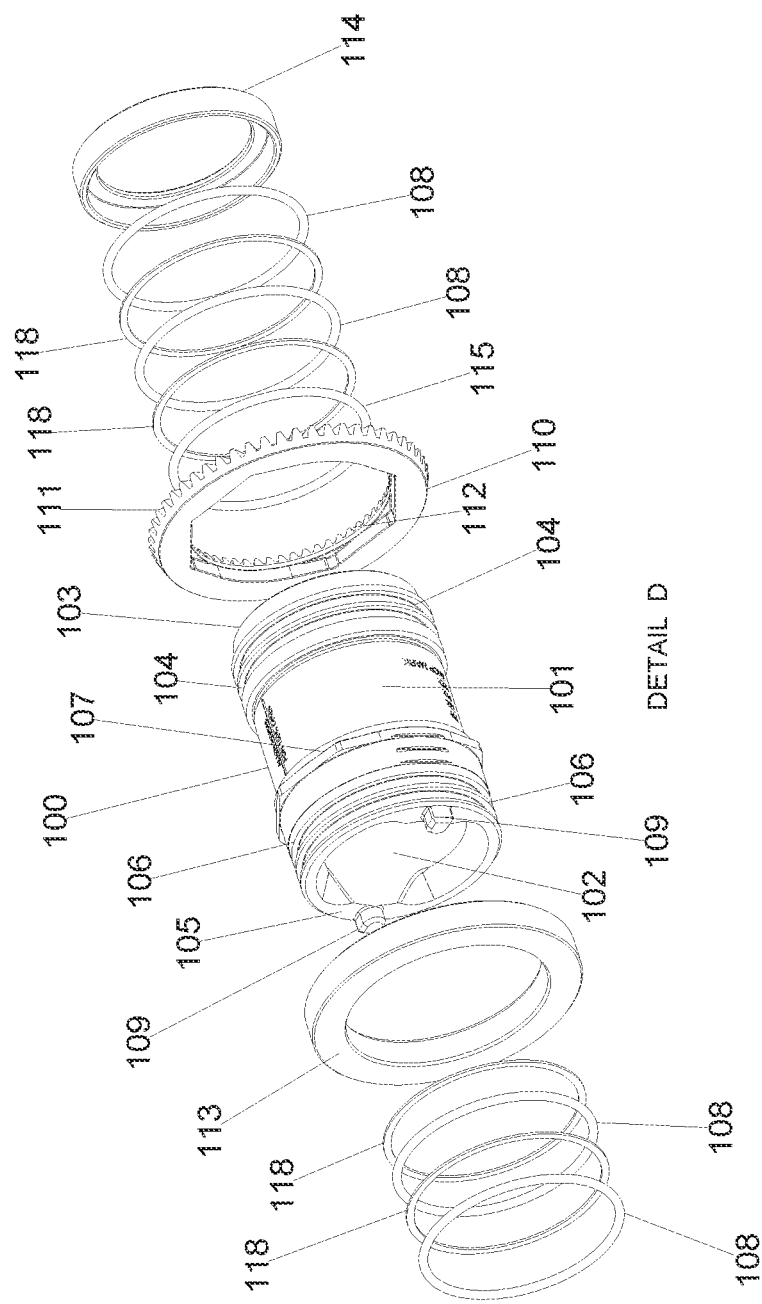
FIG. 12 depicts a perspective view of detail area "D" depicted in FIG. 9.

FIG. 12 depicts a side perspective view of detail area D of FIG. 9. In a preferred embodiment, rotator 100 is substantially cylindrical having body section 101 and central through bore 102 extending there through. Said rotator further comprises inlet seal extension 103 and outlet seal extension 105. Circumferential grooves 104 extend around inlet seal extension 103, while circumferential grooves 106 extend around outlet seal extension 105. O rings 108 and 115, which are constructed of rubber or other elastomeric sealing material, are disposed within said circumferential grooves 104 and 106; use of multiple O-rings 108 and 115 provide a complete secondary seal set in the event of failure of a primary seal (particularly in the event of inadvertent damage or slippage of said primary seal during assembly). Rotator back up rings 118 are disposed around rotator 100.

Rotator 100 further comprises external locking profile 107. Although other configurations can be utilized without departing from the scope of the present invention, in a preferred embodiment said external locking profile 107 comprises a multi-sided polygonal shape. Spaced apart lugs 109 extend from outlet seal extension 105 of rotator 100 and are configured to be received within notches 143 of second valve trim 140 depicted in FIG. 11.

Still referring to FIG. 12, bevel gear 110 is disposed around the outer surface of rotator 100. Said bevel gear 110 has a plurality of outwardly extending gear teeth 111, as well as inner profile surface 112. Said inner profile surface 112 is configured to mate with external locking profile 107, allowing for the transfer of torque forces between said components. Put another way, rotation of rotator 100 results in simultaneous rotation of said bevel gear 110. Thrust centralizer bushing 113 and centralizer bushing 114 are also disposed around the outer surface of said rotator 100.

Figure 13:
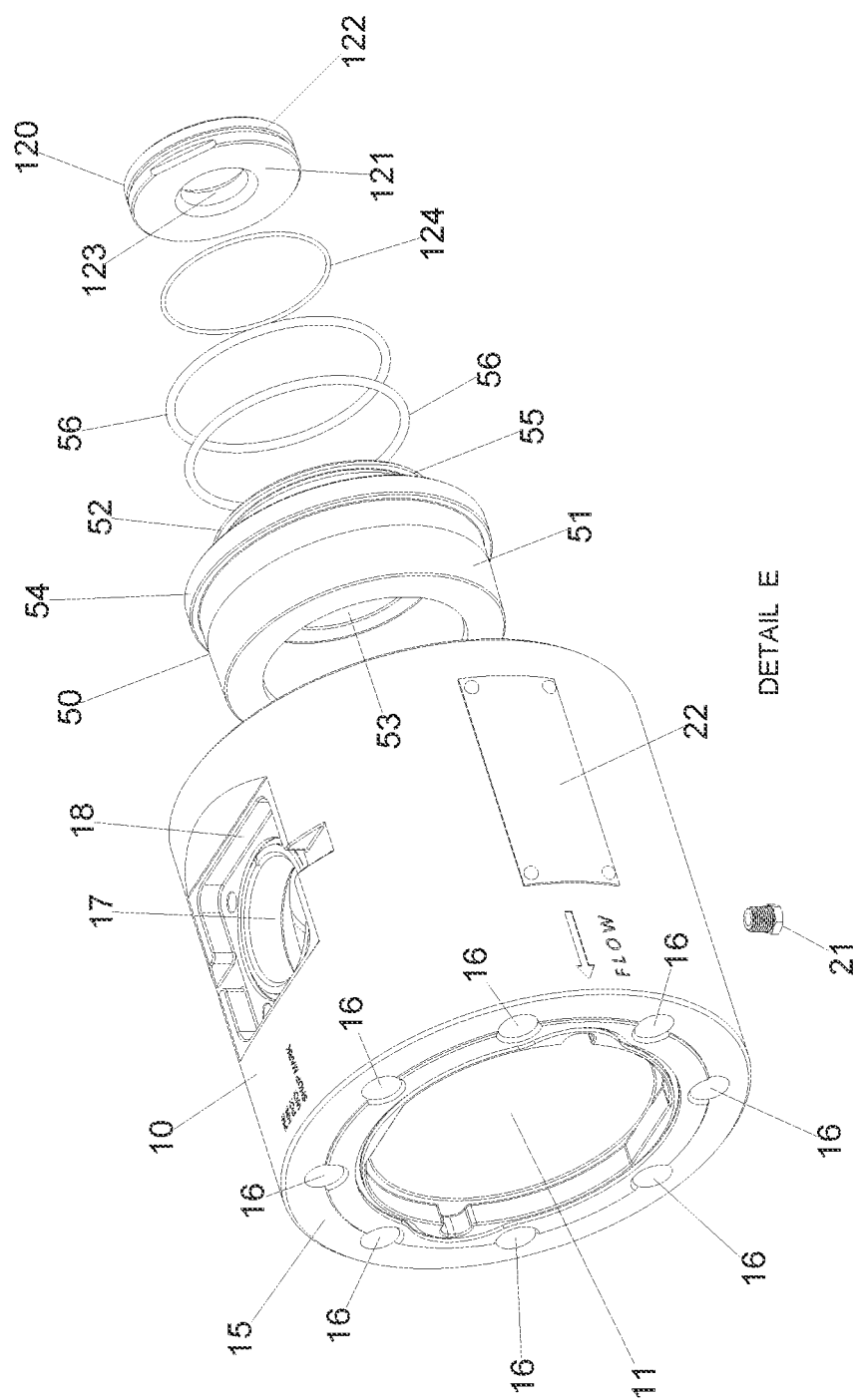
FIG. 13 depicts a perspective view of detail area "E" depicted in FIG. 9.

FIG. 13 depicts a side perspective view of detail area E of FIG. 9. Valve housing or body 10 has central through bore 11 defining an inner chamber or space within said body 10. Body 10 further defines outlet face 15 having a plurality of spaced apart socket bores 16; although not visible in FIG. 13, it is to be observed that spaced apart socket bores 16 can have internal connection threads configured to mate with threads on outlet hub bolts 170 (not depicted in FIG. 13). Said body 10 further comprises stem assembly recess 18, as well as stem assembly aperture 17 disposed within said recess 18 and extending from the outer surface of body 10 to the inner chamber or space formed by through bore 11. Externally threaded body vent plug 21 can be selectively installed on said body member 10 as described in more detail below. Optional indicia plate 22 can be secured to the outer surface of said body member 10.

Upstream cap 50 generally comprises body section 51, seal extension 52 and flange shoulder member 54. A plurality of circumferential grooves 55 extend around seal extension 52. Central through bore 53 extends through said upstream cap 50. O rings 56, which are constructed of rubber or other elastomeric sealing material, are disposed within said circumferential grooves 55.

Orifice bean 120 is received and securely restrained against movement within bore 53 of upstream cap 50. Orifice bean 120 generally comprises a disk-shaped body member 121 defining a sized orifice 123; said orifice 123 has a size and shape designed to create desired flow restriction, thereby causing a drop in flowing fluid pressure and fluid flow rate to any fluid flowing through said orifice 123. A groove 122 extends around the outer circumferential surface of said orifice bean 120. Orifice seal 124, which is constructed of rubber or other elastomeric sealing material, is disposed within said circumferential groove 122.

Figure 14:
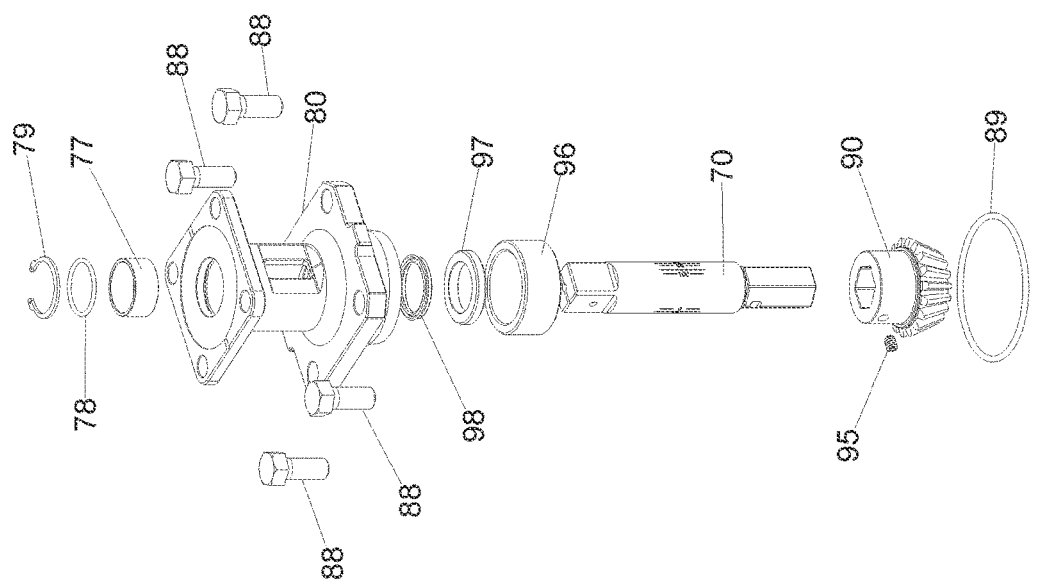
FIG. 14 depicts a perspective view of detail area "F" depicted in FIG. 9.

FIG. 14 depicts a side perspective view of detail area F of FIG. 9, which generally comprises a valve stem assembly of the present invention. Stem member 70 is rotatably disposed within stem housing 80. Stem housing 80, in turn, is secured to the upper surface of a valve body 10 (not depicted in FIG. 14) using threaded bolts 88 and stem housing seal 89, which is constructed of rubber or other elastomeric sealing material. Pinion gear 90 is secured to stem 70 using set screw 95.

Still referring to FIG. 14, detail area F of FIG. 9 also depicts stem bushing 77, O-ring 78 and stem bushing retaining ring 79 which are disposed within stem housing 80. Also depicted are stem gear bushing 96, stem thrust bushing 97 and lower seal/O-ring 98.

Figure 15:
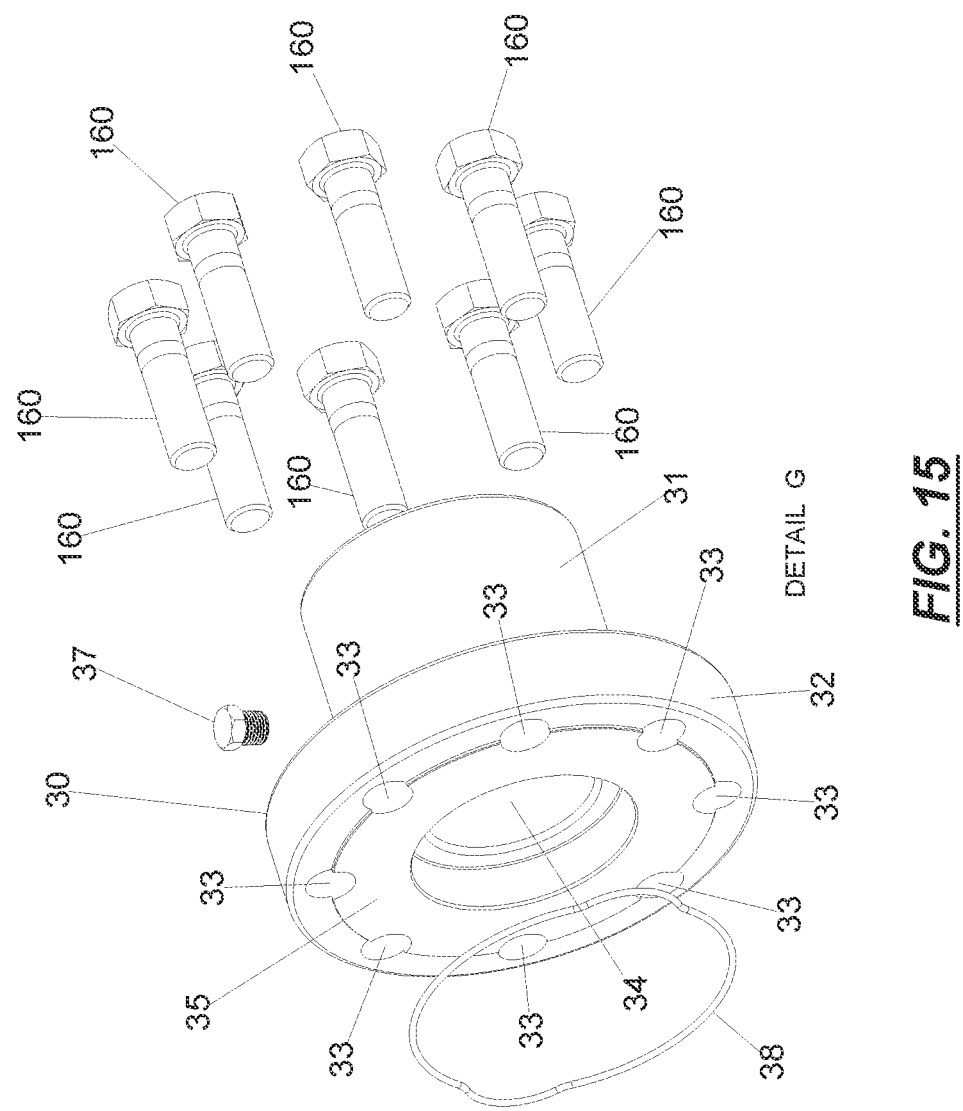
FIG. 15 depicts a perspective view of detail area "G" depicted in FIG. 9.

FIG. 15 depicts a side perspective view of detail area G of FIG. 9. Inlet hub 30 generally comprises connection extension 31 and flange member 32 defining inner flange face 35. A plurality of bores 33 are disposed around flange member 32 in spaced relationship. Central through bore 34 extends through inlet hub 30. A plurality of inlet hub bolts 160 can be received within flange bores 33. In a preferred embodiment, said inlet hub bolts 160 comprise conventional threaded bolts; however, it is to observed that other mechanical fasteners can be used without departing from the scope of the present invention. A sensor port 36 (not visible in FIG. 15) extends through connection extension 31 and into central through bore 34. A sensor port plug 37 is, in turn, received within sensor port 36 of inlet hub 30. Hub seal 38, which can be constructed of rubber or other elastomeric material having desired sealing properties, can be positioned to engage against inner face 35 of flange member 32.

Figure 16:
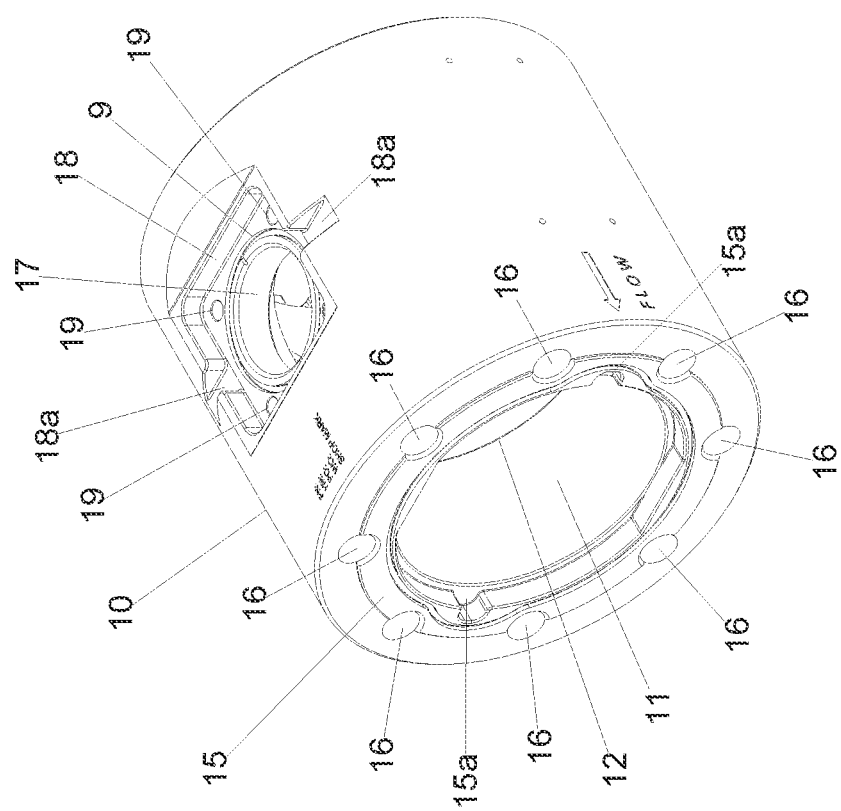
FIG. 16 depicts an overhead perspective view of a body member of the valve assembly of the present invention.
Figure 18:
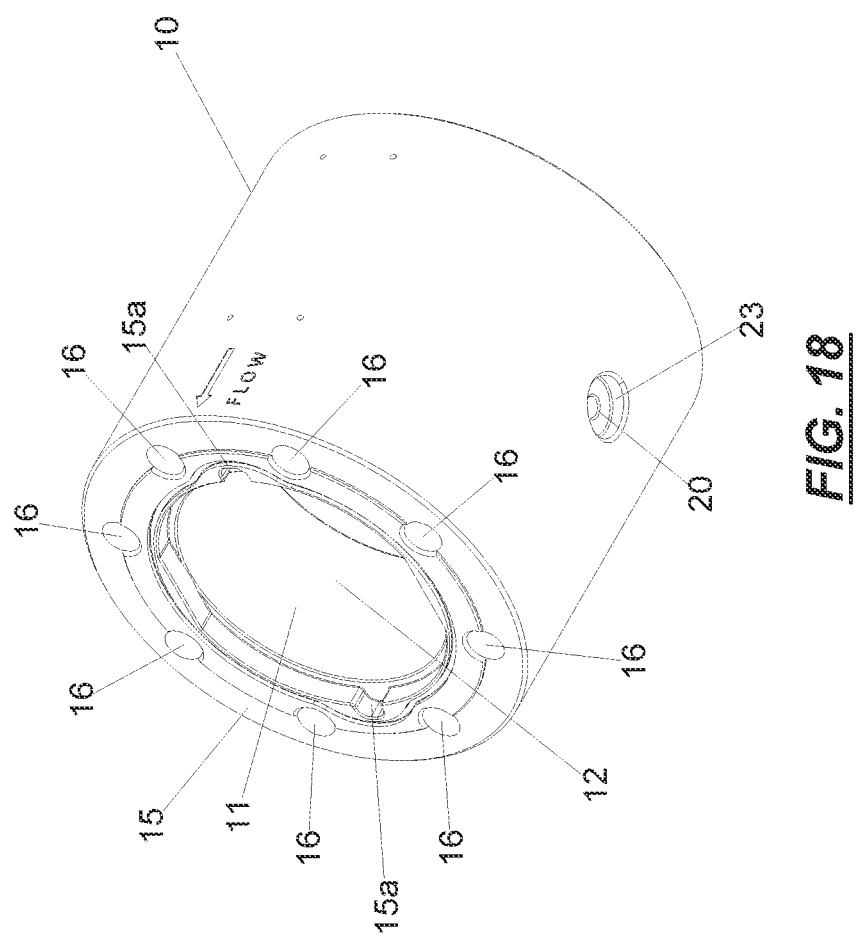
FIG. 18 depicts a bottom perspective view of a body member of the valve assembly of the present invention.

FIG. 16 depicts an overhead perspective view of body member 10 of the valve assembly of the present invention, while FIG. 18 depicts a bottom perspective view of said body member 10. Valve housing or body 10 has central through bore 11 defining an inner chamber or space 12 within said body 10. Body 10 further defines outlet face 15 having a plurality of spaced apart socket bores 16; said spaced apart socket bores 16 can have internal connection threads configured to mate with threads on outlet hub bolts 170 (depicted in FIG. 9). Pry notches 15a are disposed along at least a portion of the perimeter of central through bore 11.

Body 10 further comprises stem assembly recess 18. Stem assembly aperture 17 is disposed within said recess 18 and extends from the outer surface of body 10 to the inner chamber or space 12 formed within said body member 10. Groove 9 extends around aperture 17, while a plurality of socket bores 19 are disposed within stem assembly recess 18 and extend into body member 10. At least one "pry notch" 18a is disposed along the perimeter of stem assembly recess 18.

Figure 17:
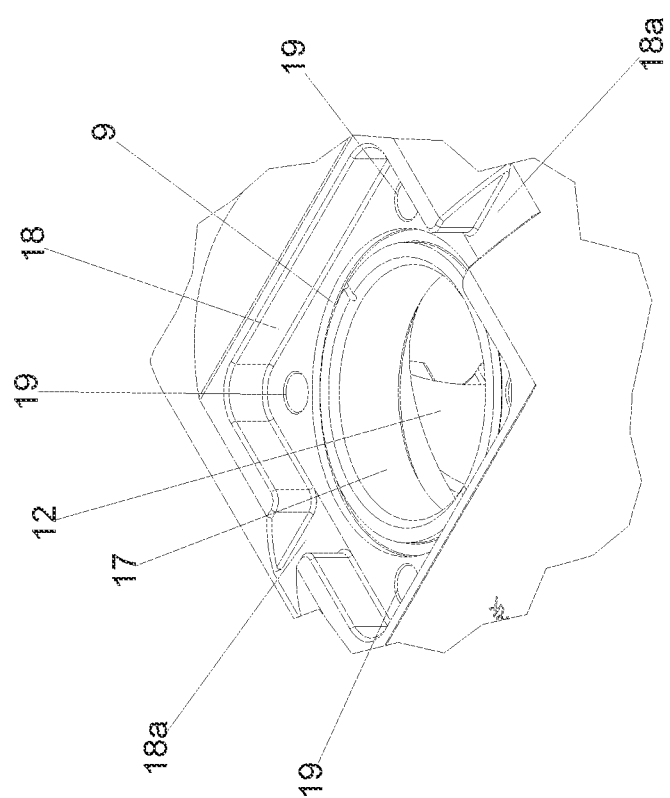
FIG. 17 depicts a perspective view of a portion of the body member of the valve assembly of the present invention depicted in FIG. 16.

FIG. 17 depicts a detailed perspective view of stem assembly recess 18, as well as stem assembly aperture 17 disposed within said recess 18. Stem assembly aperture 17 extends from the outer surface of body 10 to the inner chamber or space 12 formed within said body member 10. Groove 9 extends around aperture 17 and is configured to receive an O-ring or other seal member (such as stem housing seal 89 depicted in FIG. 14). A plurality of socket bores 19 are disposed within stem assembly recess 18 and extend into body member 10; socket bores 19 have internal connection threads configured to mate with threads on bolts 88 (depicted in FIG. 14). Pry notches 18a are disposed along the perimeter of stem assembly recess 18.

Referring to FIG. 18, body vent 20 is disposed within vent plug recess 23 and extends into the inner chamber or space 12 formed within said body member 10. A removable vent plug 21 (not depicted in FIG. 18 but shown in FIG. 13) can be installed within said body vent 20. In a preferred embodiment, said body vent 20 is positioned at approximately 180-degree phasing from stem assembly aperture 17, so that the longitudinal axes of said stem assembly aperture 17 and body vent 20 are aligned.

Figure 19:
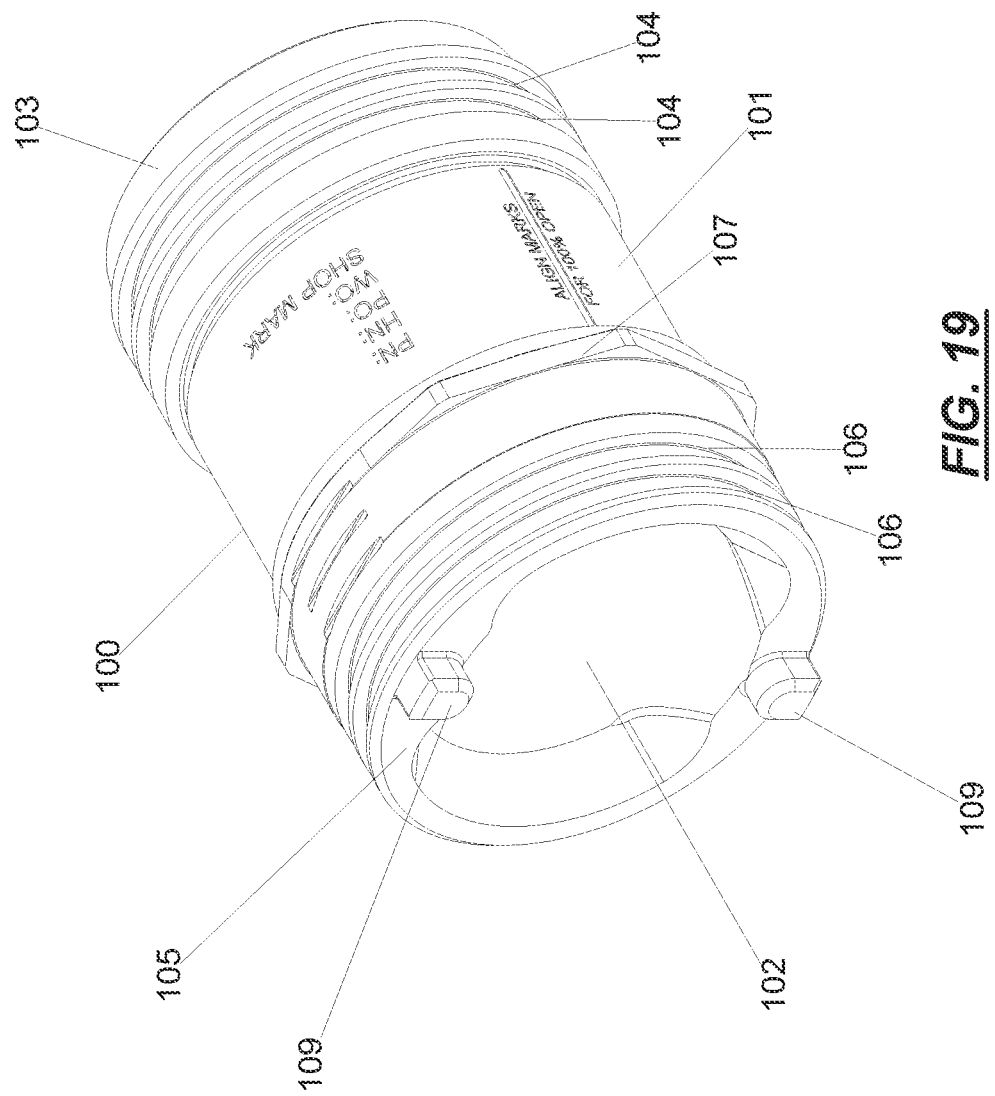
FIG. 19 depicts a perspective view of a rotator member of the valve assembly of the present invention.

FIG. 19 depicts a perspective view of a rotator 100 of the valve assembly of the present invention. Rotator 100 is substantially cylindrical and has body section 101 and central through bore 102 extending through said body section, as well as inlet seal extension 103 and outlet seal extension 105. Circumferential grooves 104 extend around inlet seal extension 103, while circumferential grooves 106 extend around outlet seal extension 105. Rotator 100 further comprises external locking profile 107. In a preferred embodiment said external locking profile 107 comprises a multi-sided polygonal shape. Spaced apart lugs 109 extend from outlet seal extension 105 of rotator 100.

Figure 20:
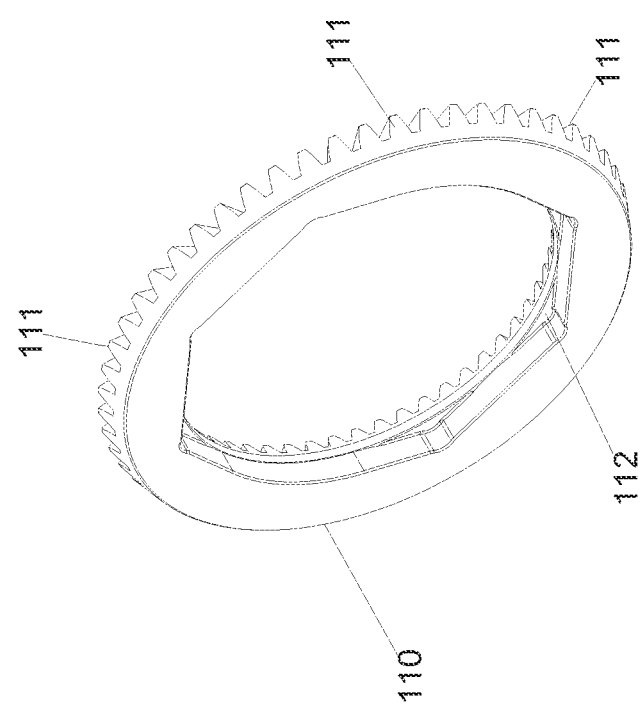
FIG. 20 depicts a perspective view of a bevel gear of the valve assembly of the present invention.

FIG. 20 depicts a perspective view of a bevel gear 110 of the valve assembly of the present invention. In a preferred embodiment, bevel gear 110 has a substantially circular shape and a plurality of outwardly extending gear teeth 111, as well as inner profile surface 112. Said inner profile surface 112 is configured to mate with external locking profile 107 of rotator 100 depicted in FIG. 19, thereby allowing for the transfer of torque forces between said components.

Figure 21:
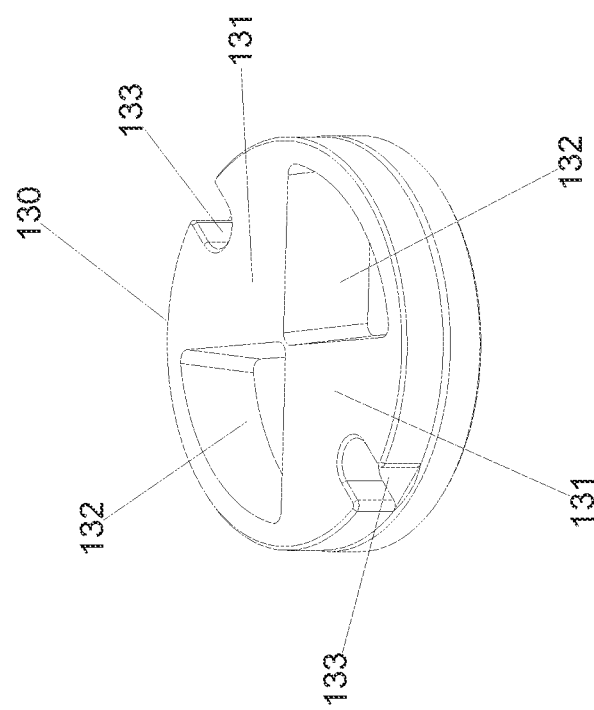
FIG. 21 depicts a perspective view of a trim member of the valve assembly of the present invention.

FIG. 21 depicts a perspective view of a first valve trim member 130 of the valve assembly of the present invention. First valve trim 130 generally comprises body section 131 and sized apertures 132 extending through said body section 131. A plurality of notches or recesses 133 are disposed along the outer perimeter of said first valve trim 130, and are configured for receiving dowels to stabilize said first valve trim 130 against rotational movement.

Figure 22:
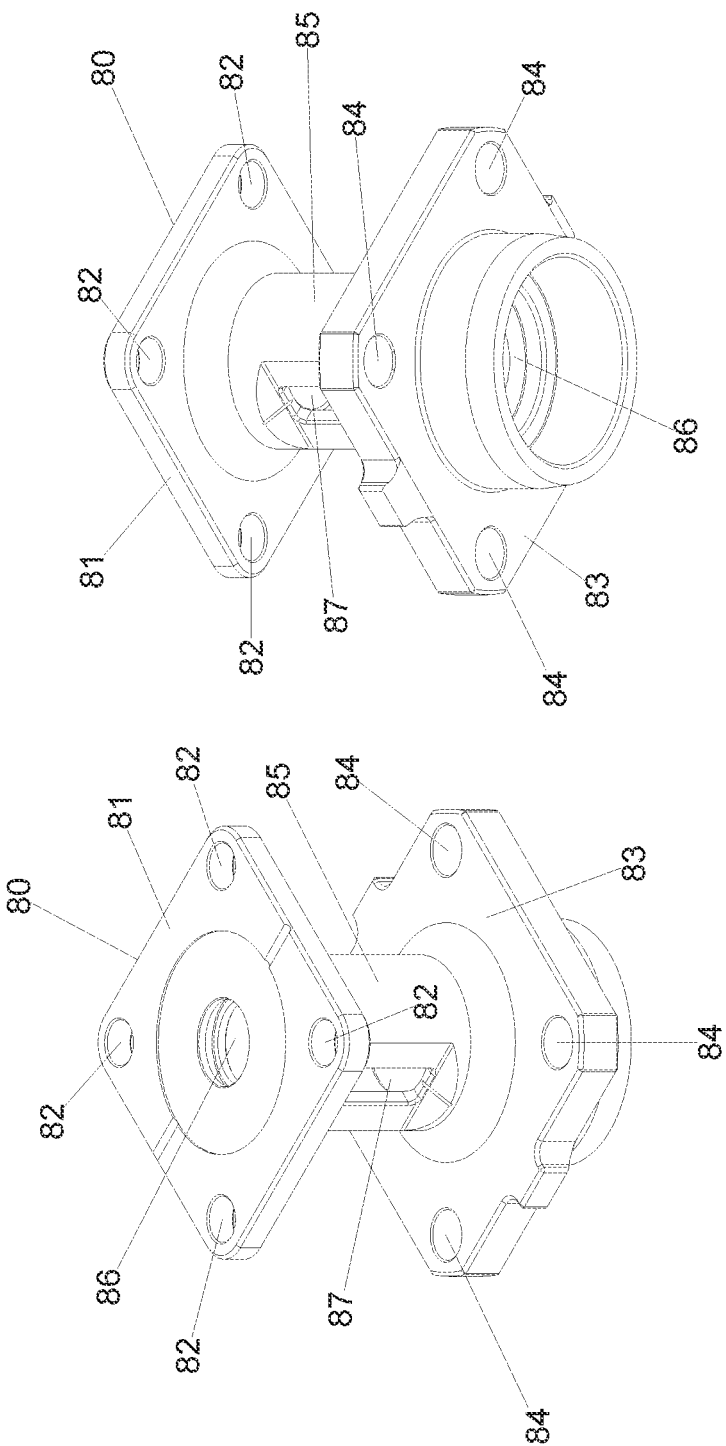
FIG. 22 depicts an overhead perspective view of a stem housing of the valve assembly of the present invention.

FIG. 22 depicts an overhead perspective view of a stem housing 80 of the valve assembly of the present invention, while FIG. 22A depicts a bottom perspective view of said stem housing 80 depicted in FIG. 22. Referring to FIGS. 22 and 22A, stem housing 80 generally comprises body section 85 having a longitudinal through bore 86 extending therethrough. Upper flange plate 81 is disposed at one end of body section 85, while lower flange plate 83 is disposed at the opposite end of said body section; in a preferred embodiment, said upper flange plate 81 and lower flange plate 83 are substantially planar and oriented substantially parallel to each other. A plurality of spaced bores 82 are disposed through upper flange plate 81, while a plurality of spaced bores 84 extend through lower flange plate 83. Window 87 extends through body section 85, thereby permitting visual observation into bore 86 of stem housing 80, as well as any objects contained therein.

Figure 23:
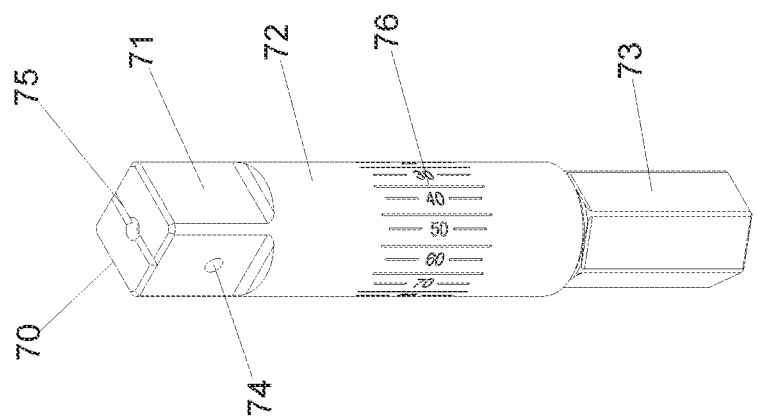
FIG. 23 depicts a perspective view of a stem member of the valve assembly of the present invention.

FIG. 23 depicts a perspective view of a stem member 70 of the valve assembly of the present invention. In a preferred embodiment, stem member 70 generally comprises upper section 71, body section 72 and lower section 73. Upper section 71 beneficially has a plurality of flat surfaces, and is configured for attachment of an actuator; said actuator can be manual (such as a handle), or automated (such as a pneumatic actuator). Said upper section can also have transverse bore 74 and upper groove 75. Body section 72 can have a substantially cylindrical shape, with indicia 76 displayed on said body section 72. Referring to FIGS. 22 and 22A, it is to be observed that indicia 76 can beneficially be visible through window 87 of said stem housing 80 when said stem 70 is installed in through bore 86 of stem housing 80. Lower section 73 can have at least one flat side.

Figure 24:
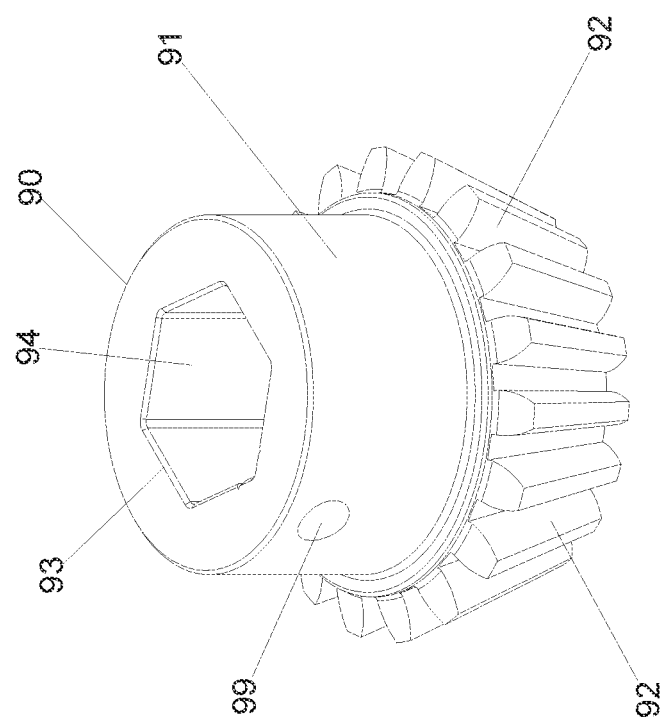
FIG. 24 depicts a perspective view of a pinion gear of the valve assembly of the present invention.

FIG. 24 depicts a perspective view of a pinion gear 90 of the valve assembly of the present invention. In a preferred embodiment, pinion gear 90 comprises body section 91 and a plurality of radially outwardly facing gear teeth 92. Said gear teeth 92 are beneficially disposed in a tapered orientation. Bore 93 defining inner surface 94 extends through body section 91, and is configured to engage in mating relationship with lower section 73 of stem member 70 depicted in FIG. 23.

Referring back to FIG. 8, a side sectional view of valve assembly 200 of the present invention is depicted along line A-A of FIG. 7. As previously noted, valve assembly 200 comprises body section 10 having a central through bore 11 and defining an inner chamber or space 12. Upstream cap 50 and inlet hub 30 are disposed at the upstream end of said body member 10, while downstream cap 60 and outlet hub 40 are disposed at the downstream end of said body member 10. Rotator 100 is rotatably disposed within inner space or chamber 12 of body 10.

Referring back to FIG. 8, which depicts a side sectional view of valve assembly 200 of the present invention along line A-A of FIG. 7, valve assembly 200 generally comprises valve body or housing 10, as well as operationally attached inlet hub 30, outlet hub 40 and actuation stem 70. Valve housing or body 10 has central through bore 11 defining an inner chamber or space 12 within said body 10. Inlet hub 30 is attached to a first end of said valve body 10 using inlet hub bolts 160. Outlet hub 40 is attached to the opposite end of valve body 10 using outlet hub bolts 170. Upstream cap 50 is partially received within body 10 and secured in place by inlet hub 30. Downstream cap 60 is also partially received within body 10 and secured in place by outlet hub 40. Wear sleeve 150 is received within outlet hub 40.

Rotator 100 is disposed within inner chamber or space 12 of housing 10; in a preferred embodiment, the longitudinal axis of said rotator 100 is oriented substantially perpendicular to the longitudinal axis of actuation stem 70. Rotator 100 further has body section 101 and central through bore 102, as well as inlet seal extension 103 and outlet seal extension 105. Inlet seal extension 103 is partially received within central through bore 53 of upstream cap 50, while outlet seal extension 105 is partially received within central through bore 63 of downstream cap 60. Rotator 100 is operationally attached to bevel gear 110. Thrust centralizer bushing 113 and centralizer bushing 114 are also disposed around the outer surface of said rotator 100. Valve assembly 200 further comprises first (stationary) valve trim 130, as well as second (movable) valve trim 140 disposed within downstream cap 60 and operationally attached to rotator 100.

Stem housing 80 is secured to the upper surface of a valve body 10 using threaded bolts 88 and stem housing seal 89, which is constructed of rubber or other elastomeric sealing material. Stem 70 is rotatably received within stem housing 80 and extends through stem assembly aperture 17 into inner chamber or space 12 within said body 10. Said stem 70 is also attached to pinion gear 90, which is operationally engaged in mating relationship with bevel gear 110.

Substantially tubular wear sleeve 150 has central through bore 151 and is received within central through bore 44 of outlet hub 40. In a preferred embodiment, port 46 extends through connection extension 41 and into central through bore 44. Poppet 48, having poppet seal 49, is movable disposed within central bore 47a of plug 47. Said plug 47 is, in turn, received within port 46 of outlet hub 40.

Orifice bean 120 is received and securely restrained against movement within bore 53 of upstream cap 50. Orifice bean 120 generally comprises a disk-shaped body member 121 defining a sized orifice 123; said orifice 123 has a size and shape designed to create desired or predetermined flow restriction, thereby causing a drop in flowing fluid pressure and fluid flow rate to any fluid flowing through said orifice 123.

Sensor port 36 extends through connection extension 31 and into central through bore 34. A sensor port plug 37 is, in turn, received within sensor port 36 of inlet hub 30. Body vent 20 is disposed within vent plug recess 23 and extends into the inner chamber or space 12 formed within said body member 10. Removable vent plug 21 can be removably installed within said body vent 20.

In operation, valve assembly 200 of the present invention comprises a valve that reduces the erosion, corrosion, and other operational problems commonly encountered with conventional valves. A desired torque force can be applied to stem 70 (typically using a manual lever handle or automated actuator) in order to rotate said stem 70. Rotation of stem 70 in turn causes rotation of pinion gear 90. Force is transferred from pinion gear 90 to bevel gear 110, thereby resulting in desired rotation of rotator 100 about an axis of rotation that is substantially parallel to the longitudinal axis of said rotator 100. Movable valve trim 140 is operationally attached to rotator 100; thus, rotation of rotator 100 in turn results in corresponding rotation of movable valve trim 140 about said axis of rotation.

The amount of fluid flow restriction and/or pressure drop through valve assembly 200 can be controlled by selective rotation of movable valve trim 140, which changes or adjusts the positioning and alignment of sized apertures 142 extending through said body section 141 of valve trim 140, relative to sized apertures 132 extending through body section 131 of stationary valve trim 130. Maximum flow rate and minimum pressure drop results when the apertures or orifices 142 of movable valve trim 140 and apertures or orifices 132 of stationary valve trim 130 are fully aligned with each other. Conversely, fluid flow rate is restricted, and fluid pressure drop is increased, as when the apertures or orifices 142 of movable valve trim 140 and stationary valve trim 130 become less aligned—that is, when the common or overlapping areas of aligned orifices or apertures of said valve trims 130 and 140 are reduced. Fluid flow rate is completely stopped (and fluid pressure drop is complete) when the apertures or orifices in movable valve trim 140 and stationary valve trim 130 are misaligned to prevent any passage of fluid through fluid throttling valve 200.

Pinion gear 90 and bevel gear 110 are used to achieve a reduced operating (opening and closing) torque and change direction of actuation of valve assembly 200. Further, pinion gear 90 and bevel gear 110 are located out of a wetted environment, making said gears and related mechanism easier to maintain and much less likely to get clogged or fouled, particularly if sand or other solid materials are present in fluid flow stream passing through valve assembly 200. Further, stem 70 and related assembly (including, without limitation, pinion gear 90) can be selectively removed and repaired/replaced without depressurizing the entire valve assembly 200.

Once properly assembled, valve stem 70 is marked with indicia 76, which is visible through window 87 of stem housing 80, to display position of movable valve trim 140 without the need for secondary devices. Said stem housing 80 further comprises at least one internal seal designed to release pressure should an internal cavity between the valve housing/body and wetted components become pressurized. Additionally, said at least one internal seal prevents against transmission of fluid pressure through any actuator mounted to upper flange plate 81; said upper flange plate 81 of stem housing 80 defines an actuator pad that permits direct mount of an actuator to valve drive stem 70. Further, the stem design allows quick and efficient transition between automated and manual actuation systems, as desired.

Body 10 of valve assembly 200 of the present invention further comprises lower drain port 20 in fluid communication with inner chamber or space 12 within said body 10 to indicate the presence of internal fluid leakage within said body 10. Said drain can be beneficially fitted with a removable filtered plug 21 to prevent dust or other external contaminant(s) from accessing inner chamber or space 12 or other interior portions of body 10 of valve assembly 200.

Components of valve assembly 200 of the present invention can be beneficially marked via engraving or laser etching for alignment to ensure and confirm proper assembly including, without limitation, "zero" position which allows for quick and easy actuator to valve calibration. Internal components having a "close fit" can include pry notches (such as, for example, notches 15a and 18a depicted in FIG. 16) to allow easy disassembly, while main internal seals have secondary backup seals should the primary seals fail. Further, internal valve components can be quickly and efficiently removed and replaced.

Hubs 30 and 40 are modular and replaceable, which allows for quick, efficient and cost-effective repair should they become damaged. Further, inlet hub 30 and outlet hub 40 include injection/monitor ports, allowing for direct injection of remediation chemicals or direct sensing of internal fluid pressure. Outlet hub 40 can permit use of pressure sensing, in combination with a sealed wear sleeve, wherein said port can serve as a wear sleeve damage indicator. Additionally, both upstream hub 30 and/or downstream hub 40 (and/or end caps 50 or 60) can also be equipped with a fixed orifice bean having a predetermined opening or orifice to permit staging of multiple pressure drops across valve assembly 200. A special hub allows a plurality of pressure drops either upstream or downstream, while pressure containing bolts have an air gap to prevent corrosive gas from saturating said bolts.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed is:

1. A fluid valve for controlling fluid flow through said valve comprising:
    a) a valve housing having a central through bore defining an inlet, an outlet, an inner chamber and a transverse bore extending through said valve housing into said inner chamber;
    b) a rotator having a first end, a second end, an exterior and a through bore extending from said first end to said second end, wherein said rotator is rotatably disposed within said inner chamber of said valve housing and extends across said transverse bore, and wherein said through bore is aligned with said inlet and said outlet of said housing;
    c) a first fluid sealing member disposed around the exterior of said rotator at said first end, wherein said first fluid sealing member prevents said fluid from flowing around said exterior of said rotator at said first end;
    d) a second fluid sealing member disposed around the exterior of said rotator at said second end, wherein said second fluid sealing member prevents said fluid from flowing around the exterior of said rotator at said second end, and wherein said transverse bore is positioned between said first and second fluid sealing members;
    e) a first valve trim having at least one first valve trim aperture, wherein said first valve trim is attached to said rotator;
    f) a second valve trim having at least one second valve trim aperture;
    g) a stem rotatably disposed through said transverse bore of said valve housing;
    h) a first gear operationally attached to said stem; and
    i) a second gear operationally attached to said rotator, wherein said first and second gears are isolated from said fluid and in mating engagement with each other, and wherein rotation of said stem causes rotation of said first valve trim relative to said second valve trim.

2. The fluid valve of claim 1, wherein said first gear comprises a pinion gear.

3. The fluid valve of claim 1, wherein said second gear comprises a bevel gear.

4. The fluid valve of claim 1, further comprising a stem housing having a body section, a bore and window extending through said body section to said bore, wherein said stem housing is disposed on said valve housing.

5. The fluid valve of claim 4, wherein said stem is rotatably disposed within said bore of said stem housing and at least partially visible through said window.

6. The fluid valve of claim 5, wherein said stem further comprises indicia visible through said window.

7. The fluid valve of claim 6, wherein said indicia corresponds to open flow area resulting from the position of said first valve trim relative to said second valve trim.

8. The fluid valve of claim 1, wherein said valve housing further comprises a drain port extending through said valve housing into a portion of said inner chamber of disposed outside of said rotator, and between said first and second sealing members.

9. The fluid valve of claim 8, further comprising a removeable drain plug disposed in said drain port.

10. A fluid valve for controlling fluid flow through said valve comprising:
    a) a valve housing having a central through bore defining an inlet, an outlet, an inner chamber and a transverse bore extending through said valve housing into said inner chamber;
    b) a stem housing having a body section, a bore and window extending through said body section to said bore, wherein said stem housing is disposed on said valve housing, and said bore of said stem housing is aligned with said transverse bore in said valve housing;
    c) a rotator having a first end, a second end, an exterior and a through bore extending from said first end to said second end, wherein said rotator is rotatably disposed within said inner chamber of said valve housing and extends across said transverse bore, and wherein said through bore is aligned with said inlet and said outlet of said housing;
d) a first fluid sealing member disposed around the exterior of said rotator, wherein said first fluid sealing member prevents said fluid from flowing around said exterior of said rotator at said first end;
e) a second fluid sealing member disposed around the exterior of said rotator at said second end, wherein said second fluid sealing member prevents said fluid from flowing around said exterior of said rotator at said second end, and wherein said transverse bore is positioned between said first and second fluid sealing members;
f) a first valve trim having at least one first valve trim aperture, wherein said first valve trim is attached to said rotator;
g) a second valve trim having at least one second valve trim aperture;
h) a stem rotatably disposed through said bore of said stem housing and transverse bore of said housing;
i) a first gear operationally attached to said stem; and
j) a second gear operationally attached to said rotator, wherein said first and second gears are in mating engagement with each other and rotation of said stem causes rotation of said first valve trim relative to said second valve trim, and wherein said first and second gears are isolated from said fluid.

11. The fluid valve of claim 10, wherein said stem is at least partially visible through said window of said stem housing.

12. The fluid valve of claim 11, wherein said stem further comprises indicia visible through said window stem housing.

13. The fluid valve of claim 12, wherein said indicia corresponds to open flow area resulting from the position of said first valve trim relative to said second valve trim.

14. The fluid valve of claim 10, wherein said valve housing further comprises a drain port extending through said valve housing into a portion of said inner chamber disposed outside of said rotator, and between said first and second sealing members.

15. The fluid valve of claim 14, further comprising a removeable drain plug disposed in said drain port.

16. The fluid valve of claim 10, further comprising a first hub removably attached to said inlet and a second hub removably attached to said outlet.

* * * * *